United States Patent
Van den Bergh et al.

(10) Patent No.: US 6,669,364 B2
(45) Date of Patent: Dec. 30, 2003

(54) CASSETTE ASSEMBLY FOR USE WITH ROENTGEN APPARATUS WITH AUTOMATIC EXPOSURE CONTROL

(75) Inventors: Rudy Van den Bergh, Lint (BE); Jurgen Van Limbergen, Bonheide (BE); Manfred Schmidt, Kircherheim (DE); Heinz Backhaus, Schrobenhausen (DE); Ernst Widemann, Dachau (DE)

(73) Assignee: Agfa-Gevaert, Mortsel (BE)

( * ) Notice: Subject to any disclaimer, the term of this patent is extended or adjusted under 35 U.S.C. 154(b) by 235 days.

(21) Appl. No.: 09/885,369

(22) Filed: Jun. 20, 2001

(65) Prior Publication Data

US 2001/0055367 A1 Dec. 27, 2001

Related U.S. Application Data

(60) Provisional application No. 60/214,419, filed on Jun. 28, 2000.

(30) Foreign Application Priority Data

Jun. 26, 2000  (EP) ............................................. 00202217

(51) Int. Cl.$^7$ ................................................ G03B 42/02
(52) U.S. Cl. ...................................... 378/185; 378/169
(58) Field of Search ............................... 378/169, 182, 378/185, 168, 176, 174

(56) References Cited

U.S. PATENT DOCUMENTS

| | | | | |
|---|---|---|---|---|
| 4,555,794 A | | 11/1985 | Finkenzeller et al. ........ | 378/187 |
| 4,983,848 A | * | 1/1991 | Hunter ..................... | 250/483.1 |
| 5,285,490 A | * | 2/1994 | Bunch et al. ............... | 378/156 |
| 5,574,768 A | * | 11/1996 | McLean ..................... | 378/185 |

FOREIGN PATENT DOCUMENTS

| | | |
|---|---|---|
| GB | 1 219 612 | 3/1968 |
| GB | 2 125 989 | 3/1984 |

* cited by examiner

*Primary Examiner*—Louis Arana
(74) *Attorney, Agent, or Firm*—Joseph T. Guy; Nexsen Pruet Jacobs & Pollard, LLC

(57) ABSTRACT

A cassette assembly comprising an X-ray cassette, with a tube side and a cover, and an intensifying screen wherein the cassette assembly further comprises a compensation element adapted to the intensifying screen so as to have a cassette assembly with predetermined X-ray absorption.

10 Claims, 1 Drawing Sheet

| FOIL |
|---|
| SUPPORT |
| PHOSPHOR LAYER |
| SILVER HALIDE FILM |

CASSETTE ASSEMBLY FOR USE WITH ROENTGEN APPARATUS WITH AUTOMATIC EXPOSURE CONTROL

This application claims the benefit of Provisional application Ser. No. 60/214,419, filed Jun. 28, 2000.

FIELD OF THE INVENTION

This invention relates to a film/screen system for use in radiography. Particular it relates to a cassette adapted for use with roentgen apparatus with automatic exposure control.

BACKGROUND OF THE INVENTION

In medical roentgen diagnosis it is very important that the patient is exposed to a radiation dose that is as small as possible and that, given that small dose, the radiologist has a diagnostically useful image. The first requirement, low dose, for the patient leads to the necessity to have the right diagnostic image with the first shot and repeat exposures due to diagnostically meaningless images has to be avoided. The second requirement, getting a readable image with that low dose, leads to the necessity that the exposure time can be adjusted for various patients, e.g. it must be possible to get a good chest image of very slim patient as well as of an obese patient without having to repeat exposure.

The manufacturers of roentgen equipment therefore introduced a phototimer. An X-ray apparatus the phototimer is placed either in the plane of the cassette or under the cassette depending on the intended use of the X-ray apparatus, e.g., in X-ray apparatus intended for mammography or thorax imaging, the phototimer is placed under (or behind) the cassette. An X-ray apparatus, wherein the phototimer is placed under the cassette operates basically as follows. An X-ray detector is placed under (i.e. on the side of the cassette farthest away from the X-ray tube) the cassette containing the film to be exposed to detect what X-ray dose is not absorbed by the patient and cassette. For every type of examination a threshold value for the dose reaching the phototimer is pre-set. This threshold value is determined by the parameters of the imaging chain (speed of the screens, speed of the film, contrast of the film, processing conditions of the film, etc.) and the parameters of the exposure (X-ray absorption of the body parts to be examined, desired film density and contrast for accurate reading of the picture) The exposure system makes sure that as long as the dose on the phototimer has not reached the pre-set threshold value the X-ray tube will emit X-rays. After a certain time of exposure the phototimer will shut down the X-ray tube. The time of exposure is thus largely governed by the absorption in the patient, in the cassette, in the film and in the intensifying screens. As long as the absorption of in the cassette, in the film and in the intensifying screens, is identical from exposure to exposure, the inclusion of the phototimer fulfils its purpose: variations in roentgen absorption of the patient are taken in account so as to have the same density and contrast on the film irrespective of the X-ray absorption of the patient.

In a "cassette assembly", comprising a cassette, a film, and an intensifying screen, the intensifying screen itself absorbs most of the energy. Thus variations in the absorption of the screen, translate changes to the time the X-ray tube is operated that are not related to the patient, so it is of high importance to produce intensifying screens with very low variation, between batches as within batches, in X-ray absorption. This is especially so for screens having very high X-ray absorption, which is most likely to occur in those diagnostic situations where low energy X-rays are used. This is, e.g., so in mammography, where mostly X-rays with an energy of 27 kVp are used. Cassettes loaded with film and screen(s) absorb then 80 to 90% of the X-rays. When the cassette loaded with film and screen(s) has and X-ray absorption of e.g. 90%, variations of 1% in that absorption will cause a phototimer to keep the X-ray tube open for a time that varies around 10%. This points out that, for high X-ray absorption, small absorption variations of the intensifying screens are enhanced by the phototimer system, so that exposure time variations can be an order of magnitude larger than the variations of the absorption of the system. The variation of the exposure time has an effect on the density of the film that, especially in mammography, are much larger than tolerated by regulations as, e.g., ACR 2002 (US-Norm). Therefor measures for diminishing the variations of the X-ray absorption of a cassette loaded with film and screen(s) to an acceptable low level is very desirable.

OBJECTS AND SUMMARY OF THE INVENTION

It is an object of the invention to provide a "cassette assembly" with very low variations of the X-ray absorption.

It is a further object of the invention to provide a "cassette assembly" with very low variations of the X-ray absorption for use with X-ray machines wherein a phototimer for automatically exposing the patient is placed under or behind the cassette assembly, i.e. on the side of the "cassette assembly" farthest away from the X-ray tube.

It is a further object of the invention to provide a "cassette assembly" with very low variations of the X-ray absorption for use with X-ray machines emitting X-rays with an energy below 50 kVp.

Further objects and advantages of the invention will become clear from the detailed description herein after.

The objects of the invention are realized by providing a cassette assembly comprising an X-ray cassette, with a tube side and a cover, and an intensifying screen, characterized that said cassette assembly further comprises a compensation element adapted to said intensifying screen so as to have a cassette assembly with predetermined X-ray absorption.

DETAILED DESCRIPTION OF THE INVENTION

Figure 1:
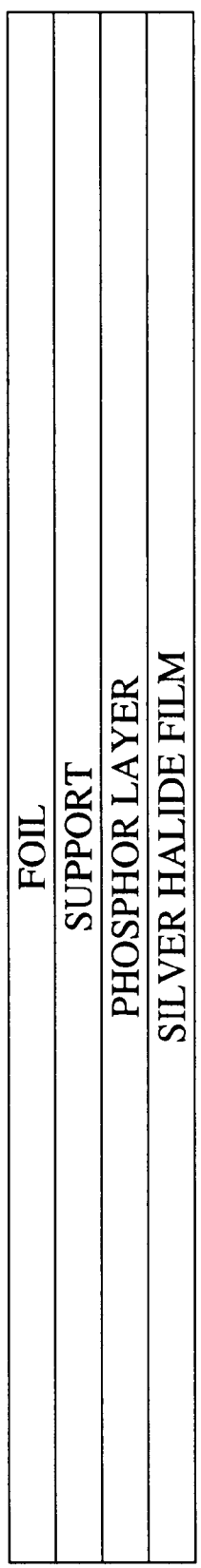
FIG. 1 is a diagrammatic representation of an embodiment of the present invention.

In this document the wording "compensation element" is used to indicate an X-ray absorbing material that is added to a cassette assembly to non-image-wise increase the X-ray absorption of that cassette assembly.

In this document the wording "cassette assembly" is used to indicate an element for use in roentgen diagnosis that comprises an X-ray cassette and an intensifying screen.

During manufacture of intensifying screens the normal statistical variations in the manufacturing process create variations in the absorption of the intensifying screens. These variations are present within the batches as well as between the batches. The absorption of the different screens can be either normally distributed around an average or not. In both case the screen or screens with the maximum absorption are identified, if necessary after removal of accidental outliers. This maximum absorption is taken as the value of the absorption that has to be the standard for that type of screen.

When the absorption of the screens is normally distributed, then on basis of the fabrication history of several batches of several types of X-ray intensifying screens the 6 sigma interval of the absorption due to statistical fluctuations during the fabrication of the screens, is determined for every type of screens. This 6 sigma interval is determined by irradiating each type of screen with the X-ray energy for which the screen is intended. For each type the upper limit of the 6 sigma interval is taken as the value of the absorption that has to be the standard for that type of screen.

When the absorption of the screens is not normally distributed, then on basis of the fabrication history of several batches of several types of X-ray intensifying screens the range of the absorption due to statistical fluctuations during the fabrication of the screens, is determined for every type of screen, the accidental outliers are removed and the upper limit of the range is taken as the value of the absorption that has to be the standard for that type of screen.

Small differences in X-ray absorption of the screens do have, when the screens are used in a diagnostic method using X-ray of low energy and phototimer switching, a large impact on the switching time of the phototimer. E.g. for screens to be used in mammography, it was determined that the absorption for X-rays with energy around 26 kVp could be considered as normally distributed and had an average value of 90% and the 6 sigma range ran from 88.5 tot 91.5%. When cassettes loaded with screens with such variations of the absorption where exposed with the same X-ray tube, operated at 26 kVp and 85 mA and with exposure control by a phototimer, the phototimer switched, for a screen with an absorption equal to the average, the tube off after 0.75 sec; for the screen with the lowest absorption the tube was switched off after 0.67 sec, and the screen with the highest absorption the tube was switched off after 0.83 sec. This comes down to a 6 sigma range of ±12% around the average value. Since the speed of the screen/film system does not depend in to such an extent to the variations of absorption, the switching of the phototimer can result in unacceptable over or under exposure of the film, which then in turn can lead to either a false diagnosis or to a retake.

It has been found that these (small) variations in absorption of the screen could, when the screen was placed in a cassette assembly, be compensated by adding a compensation element to the cassette assembly. This means that, in screens for mammography as described immediately above, for cassette assemblies incorporating a screen with absorption of 91.5%, no compensation element was added to the cassette assembly, while for all other screens a compensation element was added so as to bring the absorption to 91.5%. The compensation element can be adapted to the absorption of every individual screen so that for every individual screen a dedicated compensation element is available. The range wherein the absorption of the various screens varies due to statistical variations of the manufacturing process, is divided in a number of classes, e.g., five classes. For each of the classes the average absorption is determined and the compensation element adapted to the average absorption of the screens in every one of the classes. When the classes are numbered from A to E, wherein E represents the class with the highest average absorption, then in the cassette assembly using a screen belonging to classes A to D, a compensation element is added so as to bring the average absorption of the cassette assembly using a screen of those classes to the level of the average absorption of a cassette assembly using screens belonging to class E. The cassette assemblies using screens belonging to class E do, in this case, not receive any compensation element. Whether the correction for the variations in absorption of the screens is made so that the compensation element is adapted to the absorption of every individual screen or that the correction is only made for a number of classes of screens depends on the quality requirements in terms of density variations on the exposed film in relation to the economic imperatives. When the correction is made for a select number of classes, this number depends on the quality requirements in terms of density variations on the exposed film in relation to the economic imperatives.

A compensation element for being added to a cassette assembly according to this invention can take any form, as long as it corrects the absorption of the cassette assembly for statistical variations in the absorption of the intensifying screens. It can, e.g., be a separate foil that is added or adhered in the cassette of the cassette assembly or that is added to the outside the cassette of the cassette assembly, e.g., by adhering this foil to the outside of the cassette by an adhesive. It can also be a material applied to the backside of the screen either by adhering a separate foil to the backside of the screen or by coating an X-ray absorbing layer on that backside. A compensation element for use in a cassette assembly of this invention can further be a material applied to the cassette of the cassette assembly by coating an X-ray absorbing layer on the wall of the cassette, facing the X-ray tube (further on called "tube side") or on the opposite wall (further on called "cover"), or on both. The compensation element for a cassette assembly of this invention, can also be incorporated in the tube side of in the cover or in both. The compensation element in a cassette assembly of this invention does not even have to be incorporated in the cassette assembly, it can be provided to the customer when selling a cassette loaded with a screen and then, when an exposure is made in an X-ray apparatus with phototimer behind the cassette, the customer can insert that compensation element between the cassette and the phototimer.

The compensation element of this invention can be arranged in the cassette assembly so as to have it closer to the X-ray tube than the image forming part of the cassette assembly, i.e., the film/screen combination or it can be arranged so as to have it farther away from the X-ray tube than the image forming part of the cassette assembly. This latter position is a preferred embodiment of the invention, while then the compensation element does not risk to interfere with the signal to noise ratio of the imaging part.

It is preferred that in a cassette assembly of this invention, the compensation element is either present as a foil positioned in the cassette or that the compensation element is incorporated in the cover of the cassette.

The material used for the compensation element of this invention can be any material that has a sufficient X-ray absorption.

A foil as compensation element

When the element is present as a foil, it can in fact be made of any material that absorbs X-rays. A compensation element for use in this invention can be made, e.g., of a polymeric material, a polymeric material containing a pigment, a polymeric material coated with a pigment containing layer, paper containing a pigment, paper coated with a pigment containing layer and a metal foil. The polymeric material can be a polycondensation polymer as, e.g., polyester, (e.g., polyethyleneterephathalate, naphthalene terephathalate) polyamide, polyimide, and polycarbonate. The polymeric material can be an addition polymer as, e.g., polyacrylate, polystyrene, polyvinylchloride, etc. When a polymeric material is used as compensation element, it is preferred to use a polymeric material that comprises at least 50 mole % of polymeric moieties incorporating an element with an atomic weight larger than 20. More preferably, a polymeric material for use as compensation element in this invention, comprises at least 50 mole % of polymeric moieties incorporating an element with an atomic weight larger than 30. A typical example of such a preferred polymeric material are polyvinylchloride and addition polymers comprising at least 50% of moieties derived from chloroethene. It was found that with PolyvinylChloride (PVC)-foils having a thickness ranging from 50 to 300 $\mu$m resulted in compensations between 3.6% and 27%. Thus the invention encompasses an X-ray cassette containing in order from tube side to back side:

- a silver halide film,
- an intensifying screen with a phosphor layer coated on the first side of a support, with said phosphor layer contacting said silver halide film and
- a polymeric foil made from a polymeric material that comprises at least 50 mole % of polymeric moieties incorporating an element with an atomic weight larger than 20.

When a foil comprising a pigment is used as compensation element, be it as a coated layer or with a pigment incorporated in the mass of the polymer or the paper, it is preferred to use an inorganic compound comprising atoms with an atomic weight higher than 20, preferably equal to or higher than 40. Preferred pigments are salts derived from a metal having an atomic weight higher than 20, preferably equal to or higher than 40. Very preferred pigments are alkaline earth compounds, especially Ba compounds, Zn compounds, rare earth compounds, especially Gd compounds, Y compounds, and La compounds, compounds comprising tungsten or tantalum, and titanium compounds. Most preferred ZnO, $CaWO_4$, $BaSO_4$, PbO, $Gd_2O_2S$, $YTaO_4$, BaFBr, LaOBr, ZnS and $TiO_2$ are used as pigment. When a metal foil is used, the metal is preferably Al, Mg and Cu.

In a very suitable embodiment of the invention the compensation element is a plastic foil coated with a dispersion of $CaWO_4$ in an amount between 0.1 and 3 $mg/cm^2$. Adding such a foil to the screen results in compensations between 1 and 12%. Thus the invention encompasses an X-ray cassette containing in order from tube side to back side:

- a silver halide film,
- an intensifying screen with a phosphor layer coated on the first side of opaque support, with said phosphor layer contacting said silver halide film and
- a polymeric foil having a coating containing between 0.1 and 3 $mg/cm^2$ of $CaWO_4$.

Also adding a foil of Super White Polyethyleneterephthalate (SWP), i.e., polyethyleneterephthalate foils containing at least 10% by weight of $BaSO_4$ with respect to the polyethyleneterephthalate, to the screen can result in a correction, depending on the thickness of the SWP-foil, between 1 and 11%.

Thus the invention encompasses an X-ray cassette containing in order from tube side to back side:

- a silver halide film,
- an intensifying screen with a phosphor layer coated on a support with said phosphor layer contacting said silver halide film and
- a SWP foil with a thickness between 5 and 200 $\mu$m as compensation element.

The compensation Element as a Coating

Intensifying screens are very often coated on a black or non-transparent support and thus it is well feasable to coat a dispersion of pigment in a binder on the back side of the screen. The pigment for use in a dispersion to be coated on the back side of an intensifying screen can be any pigment as enumerated above, and thus the pigment is an inorganic material comprising atoms with an atomic weight higher than 20, preferably equal to or higher than 40. Preferred pigments are salts derived from a metal having an atomic weight higher than 20, preferably equal to or higher than 40. Very preferred pigments are alkaline earth compounds, especially Ba compounds, Zn compounds, rare earth compounds, especially Gd compounds, Y compounds, and La compounds, compounds comprising tungsten or tantalum, and titanium compounds. Most preferred ZnO, $CaWO_4$, $BaSO_4$, PbO, $Gd_2O_2S$, $YTaO_4$, BaFBr, LaOBr, ZnS and $TiO_2$ are used as pigment.

In a very useful embodiment of the invention the back side of an intensifying screen, coated on an opaque support, a dispersion of $CaWO_4$ is used. Although $CaWO_4$ emits light upon exposure to X-rays, this light will not penetrate the support of the screen and will thus not influence the exposure of the film. This is a very useful embodiment for equalizing the absorption of intensifying screens dedicated for mammography. In this case it is preferred to apply to the backside of the screen between 0.1 and 3 $mg/cm^2$ of CaWO4, which results in compensations between about 1 and 12%. The dispersion of CaWO4 can be made in any binder known in the art Suitable binders are, e.g., gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. Nos. 2,502,529, 2,887,379, 3,617,285, 3,300,310, 3,300,311 and 3,743,833. In a preferred embodiment the dispersion of the pigment, especially CaWO4, is made in a UV curable monomer or a mixture of UV curable monomers. Very suitable monomers are EBECRYL 1290 a trade name of UCB OF Belgium for an aliphatic urethane hexaacrylate and EBECRYL 264 a trade name of UCB of Belgium for an alifatic urethane triacrylate. In the mixture a photoinitiator is added, preferably DAROCURE 1173 a trade name of Ciba-Geigy of Switserland for 2-hydroxy-2-methyl-1-phenyl-propan-1-one. Thus, this invention encompasses an X-ray intensifying screen comprising an opaque support carrying on one side a phosphor layer comprising a prompt emitting phosphor, e.g., a green emitting phosphor as $Gd_2O_2S$:Tb and on the other side of the support a layer containing a pigment as compensation element. Preferably said pigment is selected from the group consisting of ZnO, $CaWO_4$, $BaSO_4$, PbO, $Gd_2O_2S$, $YTaO_4$, BaFBr, LaOBr, ZnS and $TiO_2$. Most preferably said pigment is $CaWO_4$.

The application of the layer containing a pigment on the back side of the screen can most beneficially proceed by screen printing, which makes it possible to accurately adapt the absorption of the back layer.

A compensation element for a cassette assembly of this invention can also be a coating as described above that is applied on the wall of the cassette, facing the X-ray tube (further on called "tube side") or on the opposite wall (further on called "cover"), or on both. When this is done it is preferred to have the coating applied to the cover of the cassette. It is also possible to incorporate X-ray absorbing materials in the material for manufacturing the cover of the cassette. Thus when the compensation is done by dividing the range wherein the absorption of the various screens varies due to statistical variations of the manufacturing process, in a number of classes, e.g., five classes, five covers with different X-ray absorption are provided. For each of the classes the average absorption is determined and as "compensation element" the absorption of the cover is adapted to the average absorption of the screens in every one of the classes. When the classes are numbered from A to E, wherein E represents the class with the highest average absorption, then in the cassette assembly using a screen belonging to the classes A to D, a cover is used as a "compensation element" that has an X-ray absorption so as to bring the average absorption of the cassette assembly using a screen of those classes to the level of the average absorption of a cassette assembly using screens belonging to class E.

The invention encompasses also a method for radiography, comprising the steps of providing a cassette with a front and back side containing an intensifying screen near said backside and an X-ray film with an emulsion layer in contact with said intensifying screen and a compensation element between said intensifying screen and said backside, exposing a patient, placed between an X-ray source and said front side of said cassette, by having said X-ray source emitting X-rays, registering an X-ray dose in a phototimer placed behind said backside of said cassette and having said phototimer end said exposure of said patient when a threshold X-ray dose has been absorbed by said phototimer.

The invention encompasses also a method for mammography comprising the steps of:

providing a cassette with a front and back side containing an intensifying screen near said backside and a single sided X-ray film with an emulsion layer in contact with said intensifying screen and a compensation element between said intensifying screen and said backside, exposing a patient, placed between an X-ray source and said front side of said cassette, by having said X-ray source emitting X-rays having an energy between 20 and 50 kVp, registering an X-ray dose in a phototimer placed behind said backside of said cassette and having said phototimer end said exposure of said patient when a threshold X-ray dose has been absorbed by said phototimer.

The use of compensation elements according to this invention is explained with intensifying screens, while the invention is most useful with cassettes containing intensifying screens (prompt emitting screens) and silver halide film in contact with said screens. By using a compensation element in a cassette of this invention the reproducibility of the X-ray image becomes almost as good as the reproducibility of an X-ray image acquired by digital radiography with storage phosphor screens, wherein variations in absorption of the screen can electronically be compensated. Thus the present invention bring the reproducibility of classical radiography with prompt emitting screen/film combinations to the level reached in digital radiography with storage phosphor screens.

What is claimed is:

1. A cassette assembly comprising an X-ray cassette, with a tube side and a cover, and an intensifying screen characterized that said cassette assembly further comprises a compensation element adapted to said intensifying screen so as to have a cassette assembly with predetermined X-ray absorption wherein only one intensifying screen in present.

2. A cassette assembly according to claim 1, wherein said compensation element is incorporated in said cover of said X-ray cassette.

3. A cassette assembly according to claim 1, wherein said compensation element is a foil added between said intensifying screen and said cover.

4. A cassette assembly according to claim 3, wherein said foil is made from a polymeric material that comprises at least 50 mole % of polymeric moieties incorporating an element with an atomic weight larger than 20.

5. A cassette assembly according to claim 4, wherein said foil is made from polyvinylchloride.

6. A cassette assembly according to claim 3, wherein said foil comprises a pigment selected from the group consisting of inorganic compounds comprising atoms with an atomic weight equal to or higher than 40.

7. A cassette assembly according to claim 6, wherein said pigment is selected from the group consisting of alkaline earth compounds, Zn compounds, rare earth compounds, compounds comprising tungsten, comprising tantalum, and titanium compounds.

8. A cassette assembly according to claim 6, wherein said pigment is selected from the group consisting of ZnO, $BaSO_4$, $CaWO_4$, PbO, $Gd_2O_2S$, $YTaO_4$, BaFBr, LaOEr, ZnS and $TiO_2$.

9. A cassette assembly according to claim 6, wherein said foil is selected from the group consisting of a SWP foil with a thickness between 5 and 200 $\mu$m and a polymeric foil coated with a dispersion of $CaWO_4$ in an amount between 0.1 and 3 mg/cm$^2$.

10. A cassette assembly according to claim 1, wherein said compensation element is a layer applied to said intensifying screen.

* * * * *